(12) United States Patent
Novosolov et al.

(10) Patent No.: US 12,722,082 B1
(45) Date of Patent: Sep. 1, 2026

(54) GRAPHICAL USER INTERFACE FOR ONLINE GAMES

(71) Applicant: Playtika LTD, Herzeliya (IL)

(72) Inventors: Sonya Novosolov, RaAnana (IL); Ofer Zvi Klein, Herzlia (IL); Danielle Chriqui Yastrov, Tel Aviv (IL); Amit Stoler, Tel-Aviv (IL); Maor Goldstein, Zoran (IL); Vasyl Kuznetsov, Lityn (UA); Mykola Vasylovych Tytko, Vinnytsia (UA)

(73) Assignee: Playtika LTD, Herzeliya (IL)

( * ) Notice: Subject to any disclaimer, the term of this patent is extended or adjusted under 35 U.S.C. 154(b) by 0 days.

(21) Appl. No.: 19/286,466

(22) Filed: Jul. 31, 2025

(51) Int. Cl.
*A63F 13/533* (2014.01)
*A63F 13/537* (2014.01)

(52) U.S. Cl.
CPC .......... *A63F 13/533* (2014.09); *A63F 13/537* (2014.09)

(58) Field of Classification Search
CPC ............................. A63F 13/533; A63F 13/537
See application file for complete search history.

(56) References Cited

U.S. PATENT DOCUMENTS 8,545,304 B2 * 10/2013 Aoki ................... G07F 17/3223 463/20
11,278,803 B2 * 3/2022 Nakagawa .............. A63F 13/56
12,353,689 B2 * 7/2025 Yu ......................... A63F 13/497
2006/0148551 A1 * 7/2006 Walker .................. G07F 17/323 463/16
2007/0021180 A1 * 1/2007 Osawa ................ G07F 17/3213 463/16
2008/0270240 A1 * 10/2008 Chu ................... G06Q 30/0239 434/350
2009/0197659 A1 * 8/2009 Christensen ............ G07F 17/32 463/16
2009/0238378 A1 * 9/2009 Kikinis ................ H04N 13/296 381/92
2009/0275375 A1 * 11/2009 Acres .................. G07F 17/3265 463/16
2010/0124963 A1 * 5/2010 DePalma ............ G07F 17/3262 463/16
2012/0115580 A1 * 5/2012 Hornik .................... G07F 17/34 463/43
2012/0264504 A1 * 10/2012 Gagner ............... G07F 17/3244 463/25

(Continued)

*Primary Examiner* — Malina D. Blaise

(57) ABSTRACT

There is provided a method of operating a GUI, the GUI includes: a first window associated with code that communicates with an API of a selected online game managed for presenting and/or interacting with the selected online game within the first window, a second window comprising a panel of visual interactive element, each visual interactive element communicates with a different corresponding API associated with a different corresponding interactive application, and a third window, in response to a selection of a visual interactive element in the second window, calling the corresponding API for triggering execution of the corresponding interactive application within the third window, wherein the first window, the second window, and the third window are simultaneously presented in the GUI while the selected online game is executing within the first window and while the interactive application corresponding to the selected visual interactive element is executing in the third window.

18 Claims, 11 Drawing Sheets

(56) References Cited

U.S. PATENT DOCUMENTS

2013/0036064 A1* 2/2013 Osvald .................. G06Q 20/06
705/1.1
2013/0337899 A1* 12/2013 Cannon ................ G07F 17/326
463/25
2015/0213672 A1* 7/2015 Elias .................. G07F 17/3225
463/19
2018/0161681 A1* 6/2018 Abecassis ............... A63F 13/61
2018/0225924 A1* 8/2018 Cohen ................. G07F 17/3262
2021/0183203 A1* 6/2021 Wang .................. G07F 17/3239
2023/0008548 A1* 1/2023 Wright ................ G07F 17/3227
2023/0230315 A1* 7/2023 Chai ................... G06F 3/04842
2023/0338850 A1* 10/2023 Gao .................... A63F 13/2145
2023/0343178 A1* 10/2023 Vann ................... G07F 17/3262

* cited by examiner

560

GRAPHICAL USER INTERFACE FOR ONLINE GAMES

BACKGROUND

The present invention, in some embodiments thereof, relates to graphical user interfaces (GUIs) and, more specifically, but not exclusively, to a GUI for playing online games.

A GUI (Graphical User Interface) in an online game provides visual interactive elements that let players interact with the game, such as menus, health bars, maps, and chat windows. The GUI is presented on a client terminal, and is updated in real time based on game states received from the server and local player input. In multiplayer games, GUIs often include elements like team status, player lists, and connection indicators.

SUMMARY

According to a first aspect, a system for operating a graphical user interface (GUI), comprises: a network interface configured for communicating with at least one client terminal over a network, a data storage device storing code, at least one processor of a server in operative communication with the network interface and with the data storage device, executing the code for: presenting a GUI on a display of a client terminal, wherein the GUI includes: a first window associated with code that communicates with an application programming interface (API) of a selected online game managed by the server for presenting and/or interacting with the selected online game within the first window, a second window comprising a panel of a plurality of visual interactive element, each visual interactive element communicates with a different corresponding API associated with a different corresponding interactive application, and a third window, in response to a selection of a visual interactive element in the second window, calling the corresponding API for triggering execution of the corresponding interactive application within the third window, wherein the first window, the second window, and the third window are simultaneously presented in the GUI while the selected online game is executing within the first window and while the interactive application corresponding to the selected visual interactive element is executing in the third window.

According to a second aspect, a method of operating a graphical user interface (GUI), comprises: presenting a GUI on a display of a client terminal, wherein the GUI includes: a first window associated with code that communicates with an application programming interface (API) of a selected online game managed by a server for presenting and/or interacting with the selected online game within the first window, a second window comprising a panel of a plurality of visual interactive element, each visual interactive element communicates with a different corresponding API associated with a different corresponding interactive application, and a third window, in response to a selection of a visual interactive element in the second window, calling the corresponding API for triggering execution of the corresponding interactive application within the third window, wherein the first window, the second window, and the third window are simultaneously presented in the GUI while the selected online game is executing within the first window and while the interactive application corresponding to the selected visual interactive element is executing in the third window.

According to a third aspect, a non-transitory medium storing program instructions for operating a graphical user interface (GUI), comprising program instructions which when executed by at least one processor, cause the at least one processor to: present a GUI on a display of a client terminal, wherein the GUI includes: a first window associated with code that communicates with an application programming interface (API) of a selected online game managed by a server for presenting and/or interacting with the selected online game within the first window, a second window comprising a panel of a plurality of visual interactive element, each visual interactive element communicates with a different corresponding API associated with a different corresponding interactive application, and a third window, in response to a selection of a visual interactive element in the second window, call the corresponding API for triggering execution of the corresponding interactive application within the third window, wherein the first window, the second window, and the third window are simultaneously presented in the GUI while the selected online game is executing within the first window and while the interactive application corresponding to the selected visual interactive element is executing in the third window.

In a further implementation form of the first, second, and third aspects, the selected online game is mapped to a first virtual device located at a first virtual location, wherein the different corresponding interactive applications associated with the plurality of visual interactive elements presented in the second window comprise a plurality of candidate virtual devices located at corresponding a plurality of virtual locations, each candidate virtual device linked to a different online game, and further comprising code for: in response to the selection of the visual interactive element in the second window mapped to a second virtual device at a second virtual location associated with a second online game, calling the corresponding API for triggering execution of the second online game for execution and/or interaction within the first window.

In a further implementation form of the first, second, and third aspects, the corresponding interactive applications comprise slot games, the plurality of candidate virtual device comprise a plurality of virtual slot machines that run the slot games.

In a further implementation form of the first, second, and third aspects, the application running in the third window comprises a multi-user interactive session configured for communication between a plurality of GUIs executing on a plurality of client terminals of a plurality of users interacting with a plurality of online games executing in the first window of each of the plurality of GUIs.

In a further implementation form of the first, second, and third aspects, the selected online game is configured for a single-player, wherein a plurality of client terminals used by a plurality of users are simultaneously interacting with the selected online game each as the single-player, and wherein the application running in the third window comprises a multi-user interactive session configured for communication between GUIs executing on a plurality of client terminals of a sub-set of the plurality of users interacting with the selected online game.

In a further implementation form of the first, second, and third aspects, further comprising code for: computing data based on a current game state of the selected online game executing in the first window in response to interaction by a user with the selected online game, forwarding the computed data to the API of the application executing in the third window, and dynamically updating a visual presentation within the third window according to a state of the application executing in the third window in response to the computed data.

In a further implementation form of the first, second, and third aspects, the application executing in the third window comprises the visual presentation of a state of a plurality of mission for the user to complete by playing the selected online game executing in the first window, wherein the state of the plurality of missions is dynamically updated according to the data computed based on the current game state of the selected online game.

In a further implementation form of the first, second, and third aspects, further comprising code for: receiving a selection of a sub-element presented in the third window via the API of the application executing in the third window, computing an updated game state of the selected online game executing in the first window according to the selected sub-element, and dynamically updating a virtual presentation within the first window according to the updated game state.

In a further implementation form of the first, second, and third aspects, the application executing in the third window comprises a virtual store for purchasing virtual objects and/or virtual attributes for implementation in the online game executing in the first window, wherein an amount of virtual currency available for being used for purchase in the virtual store is presented in the first window and computed based on at least one metric measured from monitoring of a state of the online game in the first window, and wherein the selection of the sub-element presented in the third window comprises a purchase of a virtual object or virtual attribute.

In a further implementation form of the first, second, and third aspects, further comprising code for: in response to selecting a visual interactive element from the second window mapped to features, presenting a plurality of second visual interactive elements in the third window, each of the plurality of second visual interactive elements is associated with code for triggering a different feature of the selected online game executing in the first window, in response to selecting a second visual interactive element from the plurality of second visual interactive elements, implementing the specific feature corresponding to the second visual interactive element within the selected online game presented in the first window.

In a further implementation form of the first, second, and third aspects, further comprising code for: in response to selecting a visual interactive element from the second window mapped to a mini-game managed by the server, executing the mini-game within the third window, wherein the mini-game is executed for being presented with and/or being interacted with in the third window simultaneously with execution of the selected online game that is being presented and/or interacted with in the first window.

In a further implementation form of the first, second, and third aspects, the mini-game is at least one of: (i) designed for being presented with and/or interacted with in the third window which is significantly smaller than a full screen and/or smaller than the first window, (ii) designed for being presented with and/or interacted with on a full screen, and is dynamically minimized for execution for being presented with and/or interacted in the third window.

In a further implementation form of the first, second, and third aspects, further comprising code for: dynamically monitoring at least one metric of the mini-game during interaction by the user via the third window, and computing an updated state of the online game according to the at least one metric, and dynamically updating a visual presentation of the online game executing in the first window according to the update state.

In a further implementation form of the first, second, and third aspects, further comprising code for: in response to selecting a visual interactive element from the second window mapped to features, presenting a plurality of second visual interactive elements in the third window, each of the plurality of second visual interactive elements is associated with code for triggering a different mini-game for execution in the third window and terminating the presentation of the plurality of second visual interactive elements in the third window, wherein the mini-game is executed in response to a selection of a corresponding second visual interactive element in the second window.

In a further implementation form of the first, second, and third aspects, further comprising code for: in response to an interaction action performed on at least one of the plurality of visual interactive elements by a user interacting with the second window, dynamically adapting an order of the plurality of visual interactive elements while maintaining a mapping between each of the plurality of visual interactive elements and corresponding interactive application, wherein the mini-game is executed in response to a selection of one of the plurality of visual interactive elements.

In a further implementation form of the first, second, and third aspects, further comprising code for: in response to a second selection of a second visual interactive element in the second window, dynamically switching the interactive application executing in the third window to a second interactive application triggered in response to the second selection, wherein the dynamically switching is performed while the selected online game is executing within the first window.

In a further implementation form of the first, second, and third aspects, further comprising code for: monitoring a state of the online game executing in the first window, generating a notification according to the state, dynamically presenting the notification in a fourth window overlaid on the third window and excluding overlay on the first window, and terminating the presentation when the monitored state of the online game changes to a second state unrelated to the notification.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
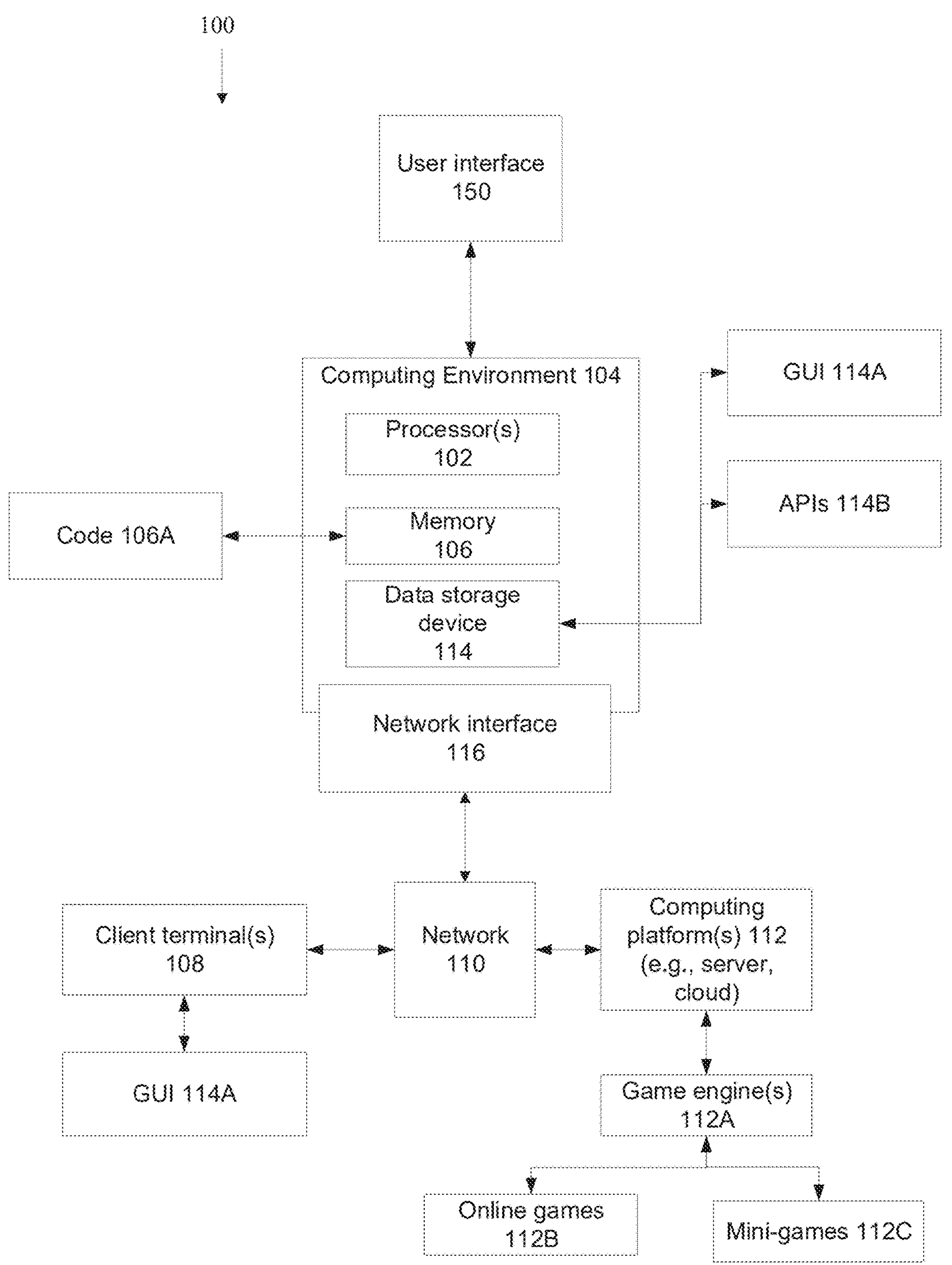
FIG. 1 is a block diagram of components of a system for operating a GUI for playing an online game, in accordance with some embodiments of the present invention.

The present invention, in some embodiments thereof, relates to graphical user interfaces (GUIs) and, more specifically, but not exclusively, to a GUI for playing online games.

An aspect of some embodiments of the present invention relates to systems, methods, computing devices, and/or code instructions (stored on a data storage device and executable by one or more processors) for operating a graphical user interface for playing an online game managed by a server and/or computing cloud. The GUI includes three windows. A first window is designed for presenting and/or for enabling a user to interact with a selected online game. A second window includes multiple visual interactive element, for example, a panel of icons. Each respective visual interactive element is associated with a different interactive application, for example, mini-games, an online store for purchase of in-game items, a list of missions to accomplish in the game, and the like. A selection of a visual interactive element in the second window triggers execution of the corresponding interactive application within a third window. The first window, the second window, and the third window are simultaneously presented in the GUI, while the selected online game is executing within the first window and while the interactive application corresponding to the selected visual interactive element is executing in the third window.

At least one embodiment described herein addresses the technical problem of inefficient user interface design in online gaming systems. At least one embodiment described herein improves the technology of GUIs. At least one embodiment described herein improves over existing GUIs for playing online games. At least one embodiment described herein provides the practical application of an enhanced user experience in terms of speed, accuracy, and/or visibility of playing an online game provided by the GUI described herein.

Conventional GUIs require users to navigate through multiple screens or exit their current game to access auxiliary features, resulting in interrupted gameplay and poor user experience. At least one embodiment described herein provides a significant improvement to GUI technology by implementing a three-window simultaneous display architecture that enables seamless multitasking within a single interface. At least one embodiment described herein presents a first window for the primary online game, a second window containing multiple interactive elements (such as mini-games, virtual stores, mission trackers, and interactive chat sessions with other users), and a third window that dynamically executes applications corresponding to selected elements from the second window-all operating concurrently without interrupting the main game session. The GUI of at least one embodiment offers practical applications by allowing real-time cross-window communication where actions in the third window (such as earning virtual currency in mini-games or purchasing items in virtual stores) directly update the game state in the first window, while game progress in the first window simultaneously updates mission status and other metrics in the third window. The GUI of at least one embodiment may further enhance the user's experience through intelligent notification management that presents alerts in designated areas without overlaying the primary game window, and/or enables rapid game switching through virtual device mapping without requiring traditional navigation through virtual environments, thereby solving the technical challenge of maintaining user engagement while providing comprehensive gaming functionality.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
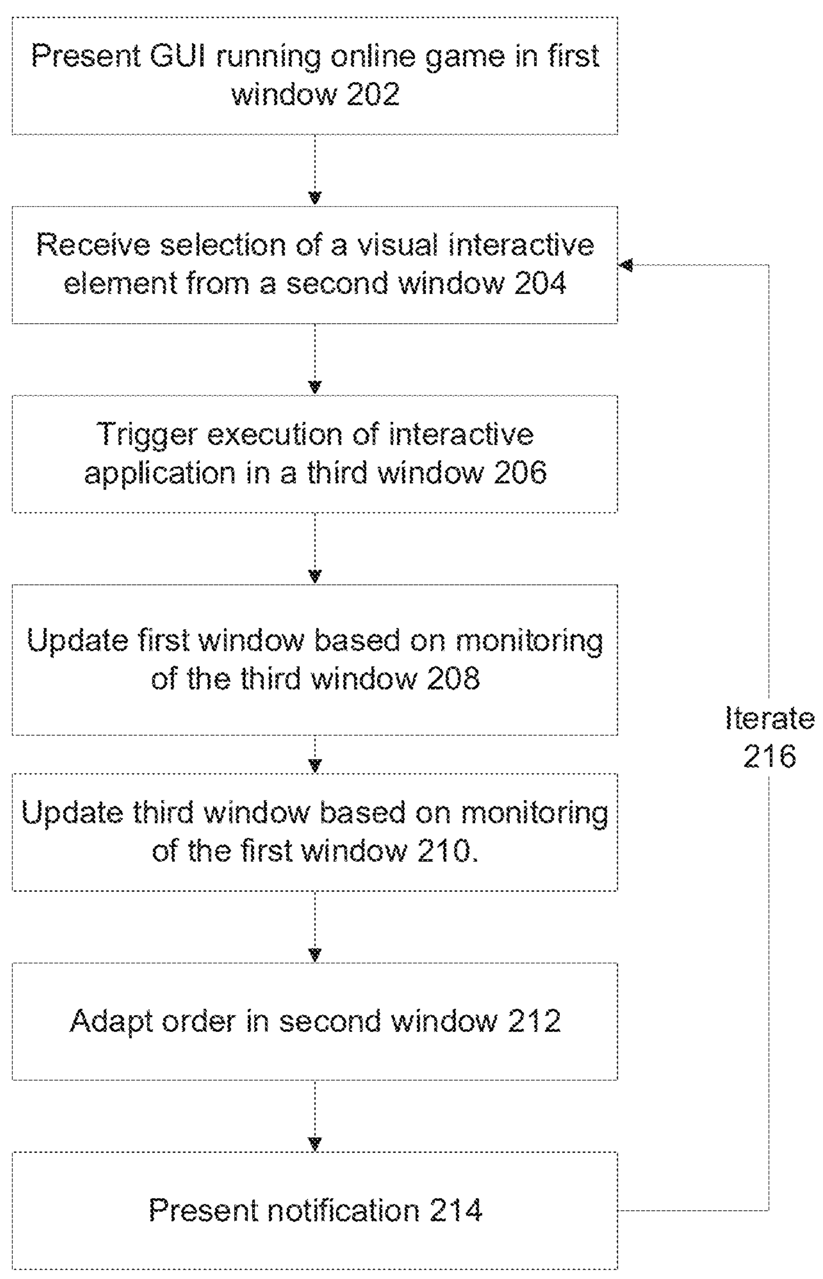
FIG. 2 is a flowchart of a method for operating a GUI for playing an online game, in accordance with some embodiments of the present invention.
Figure 3:
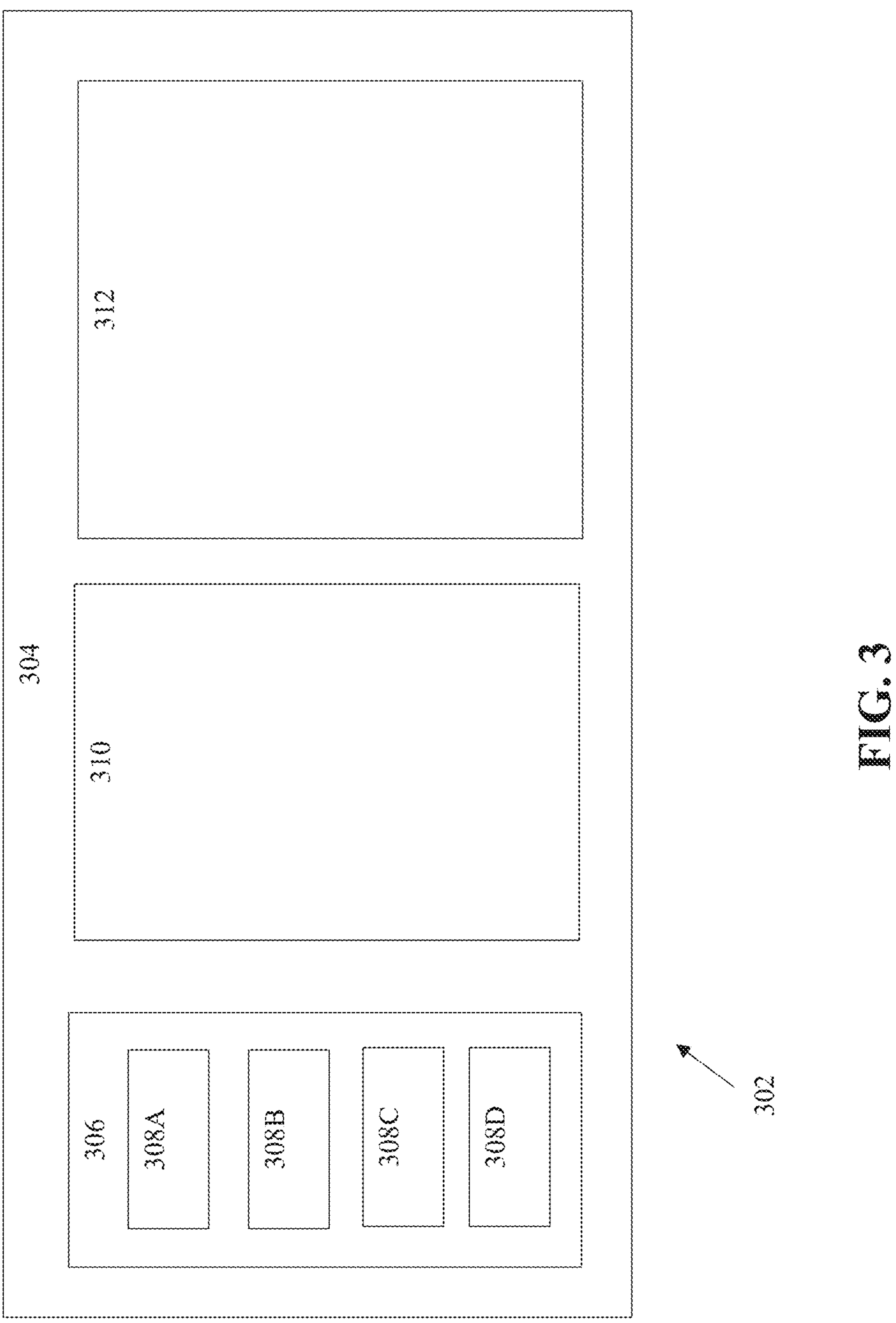
FIG. 3 is a schematic of an exemplary GUI 302 for an online game, in accordance with some embodiments of the present invention.
Figure 4:
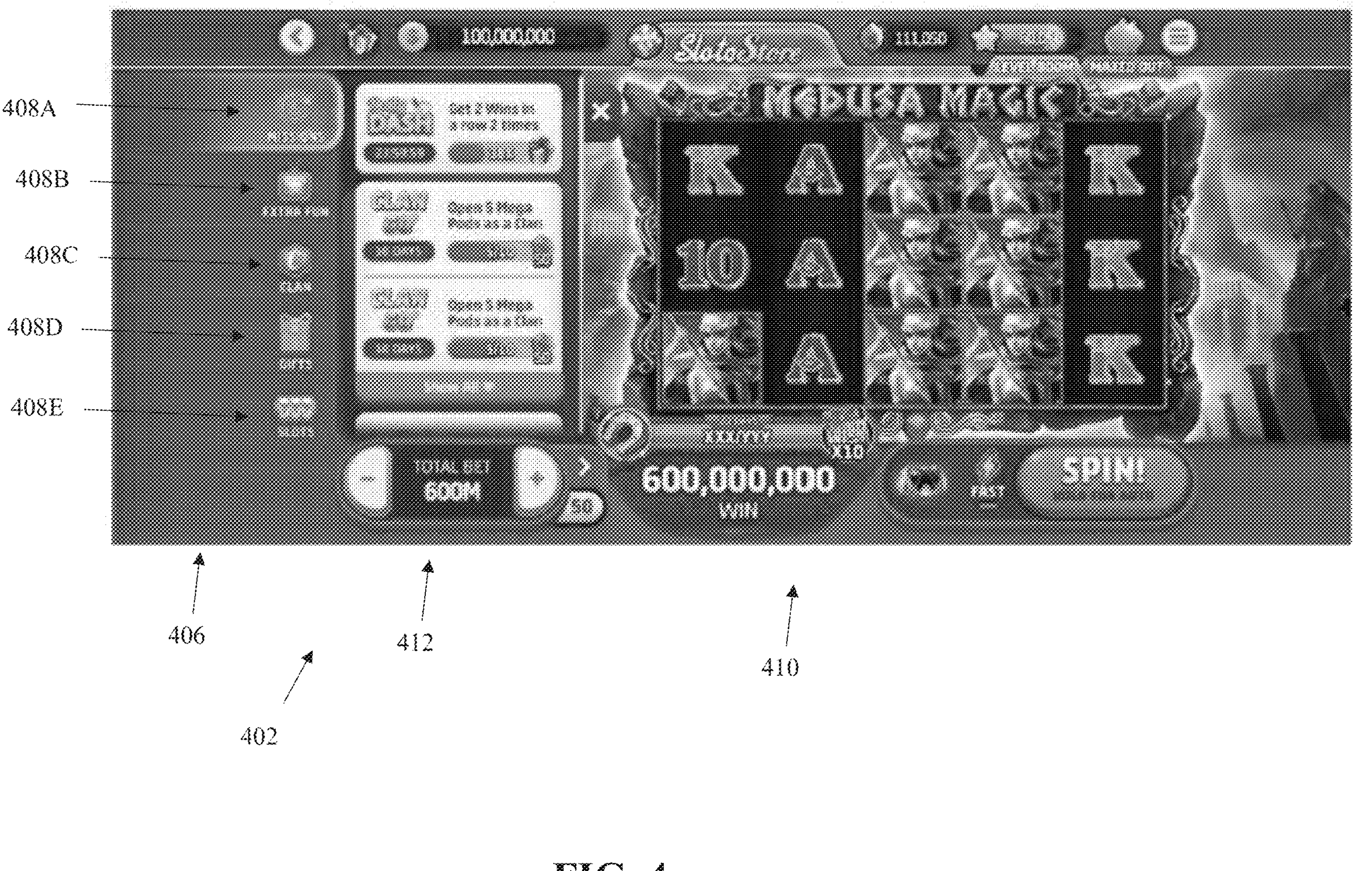
FIG. 4 is a schematic of an exemplary GUI 402 for playing an online game, in accordance with some embodiments of the present invention.
Figure 5A:
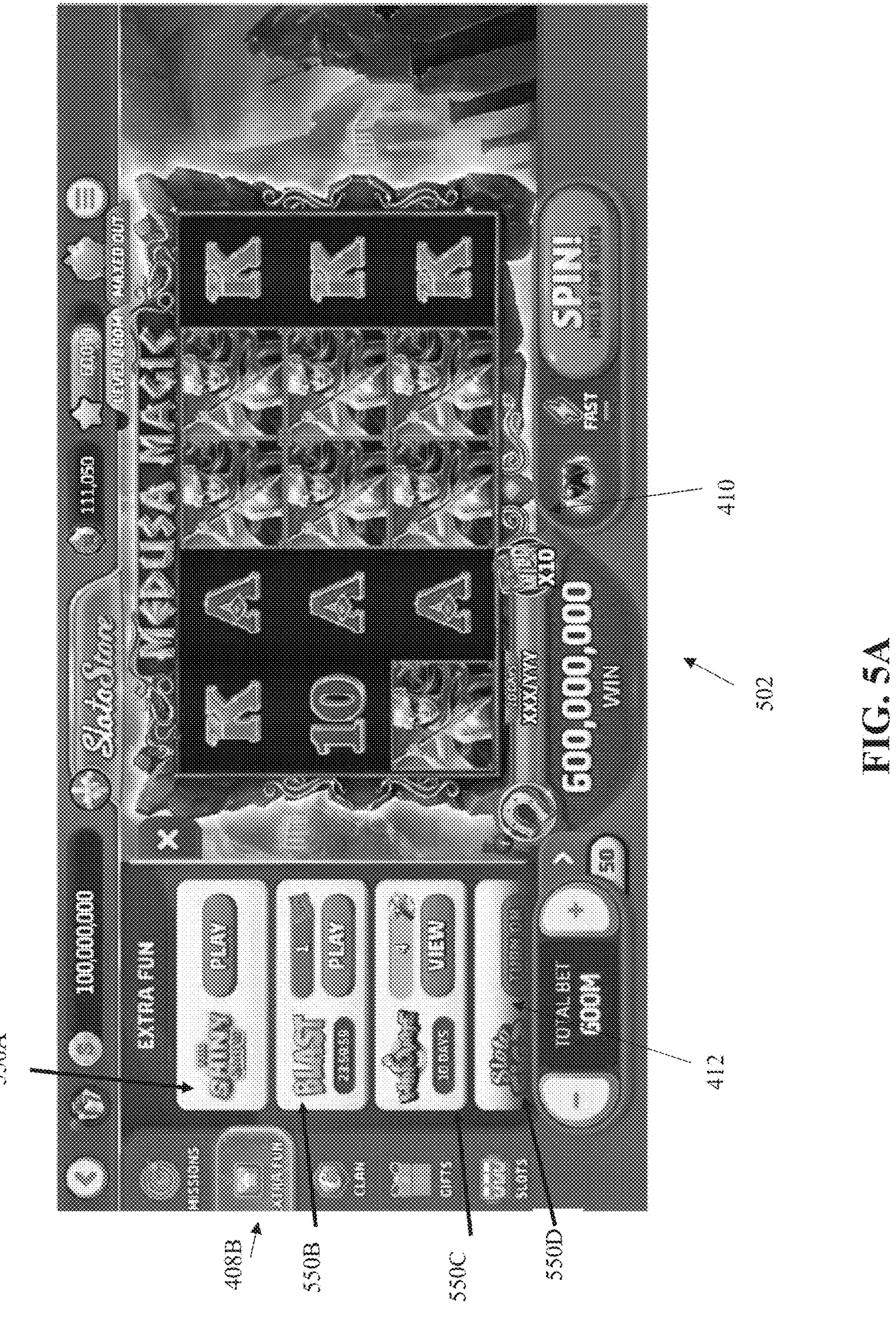
FIG. 5A is a schematic of a state 502 of GUI 402 of FIG. 4 in response to selecting visual interactive element 408B (extra fun), in accordance with some embodiments of the present invention.
Figure 5B:
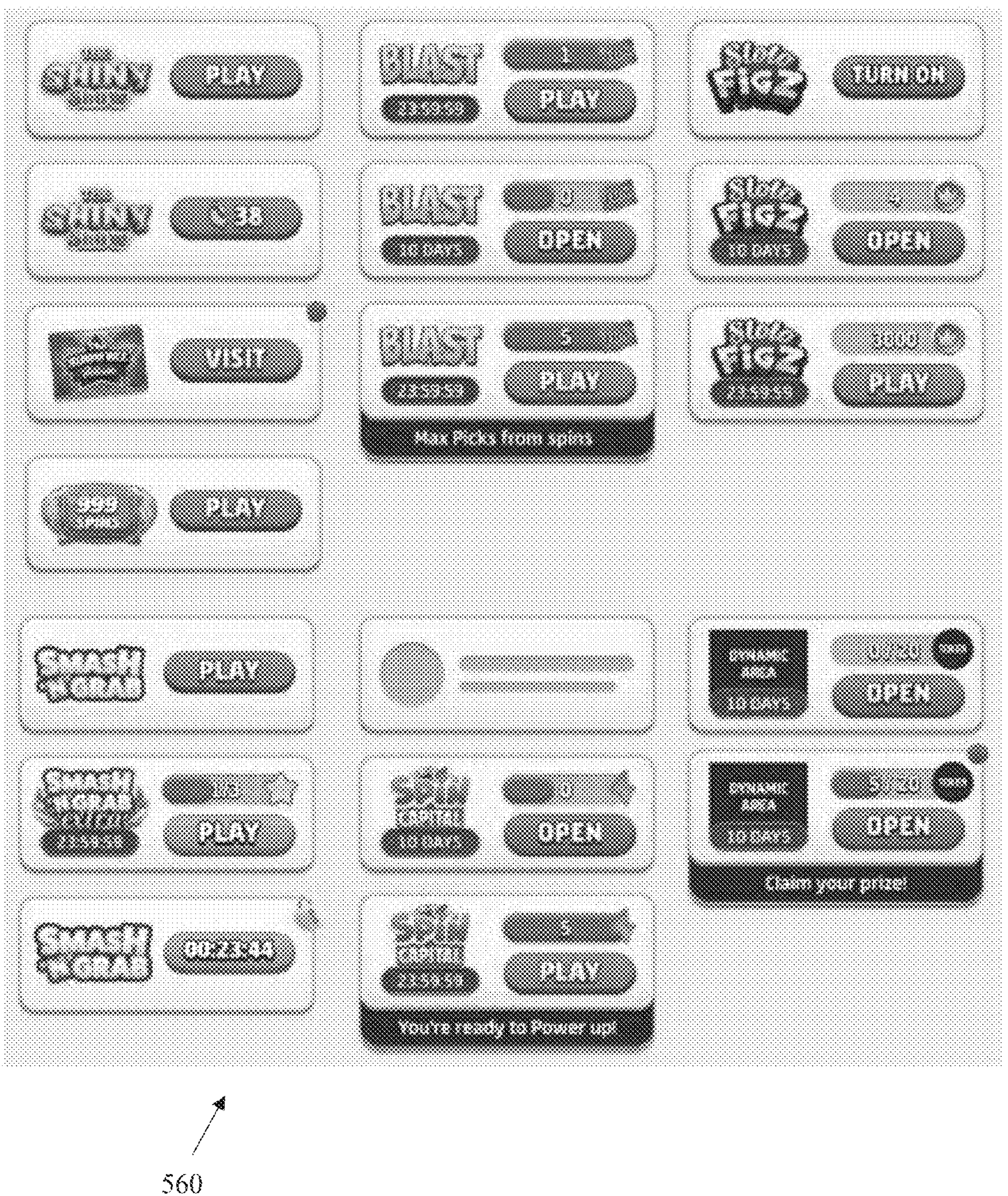
FIG. 5B is a schematic depicting examples of additional visual interactive elements 560 that may be presented in the third window of the GUI in response to selection of a certain visual interactive element from the second window, in accordance with some embodiments of the present invention.
Figure 6:
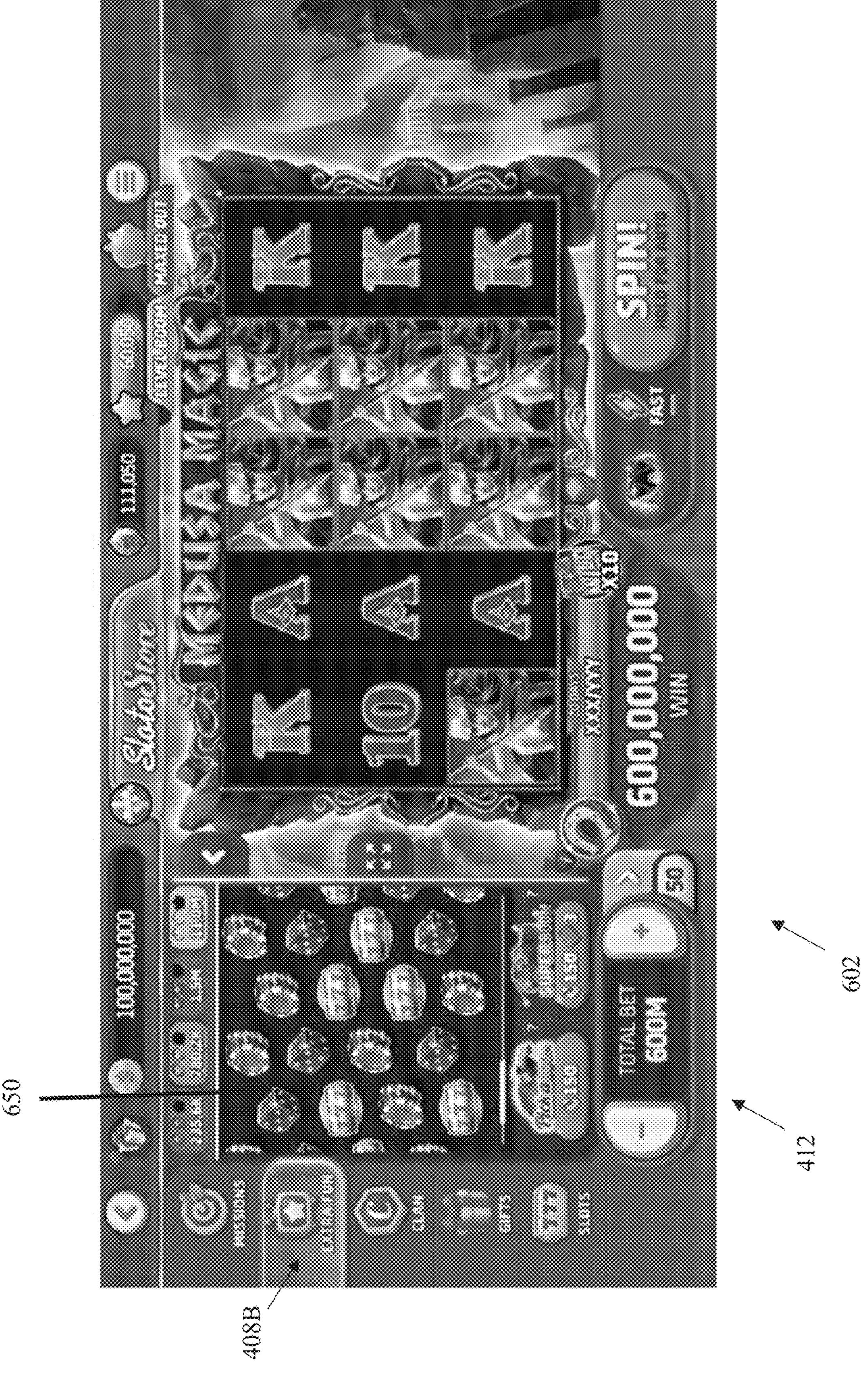
FIG. 6 is a schematic of another state 602 of GUI 402 of FIG. 4 in response to selecting visual interactive element 408B (extra fun), in accordance with some embodiments of the present invention.
Figure 7:
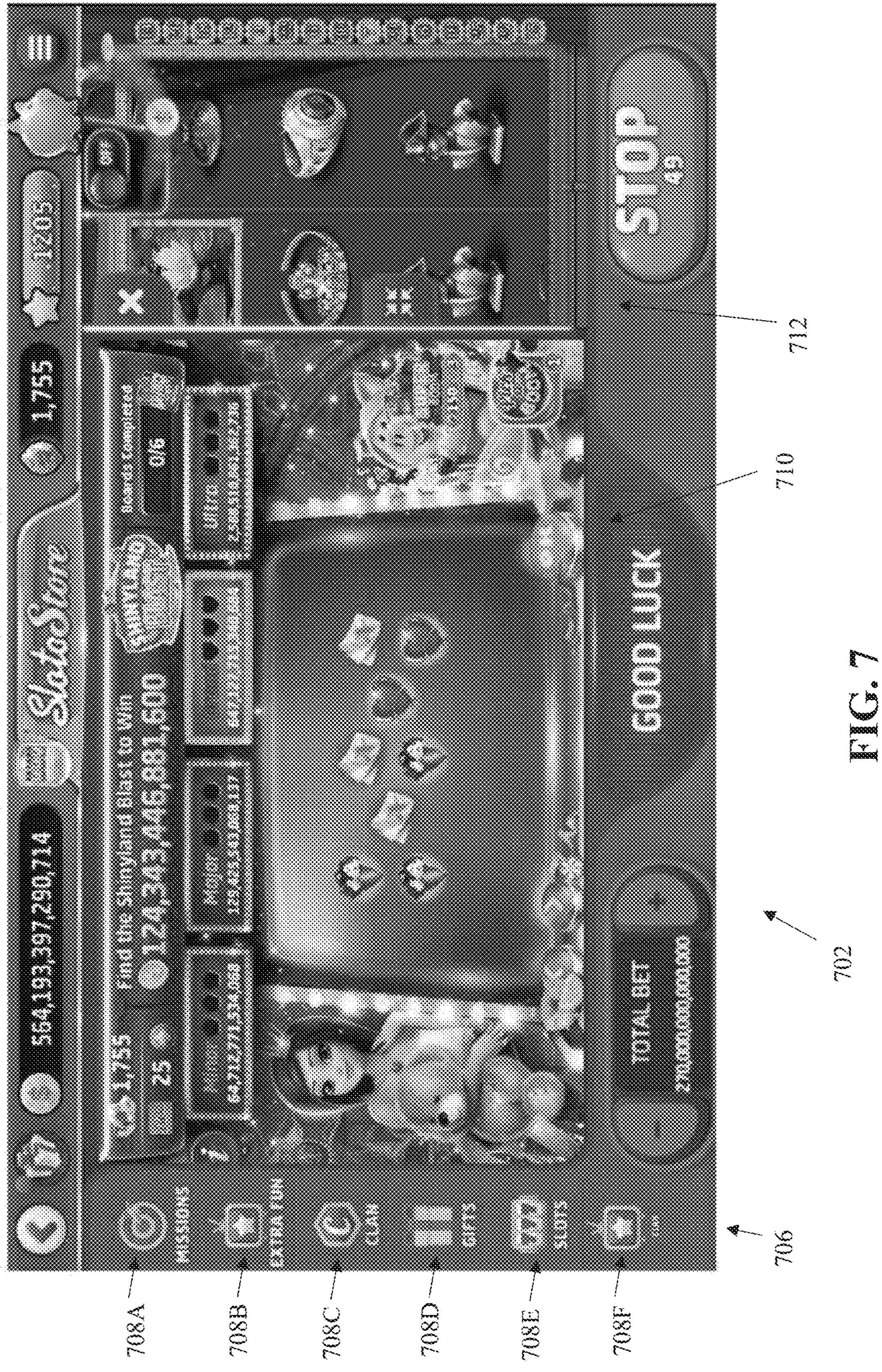
FIG. 7 is a schematic of another exemplary GUI 702 for playing an online game, in accordance with some embodiments of the present invention.
Figure 8:
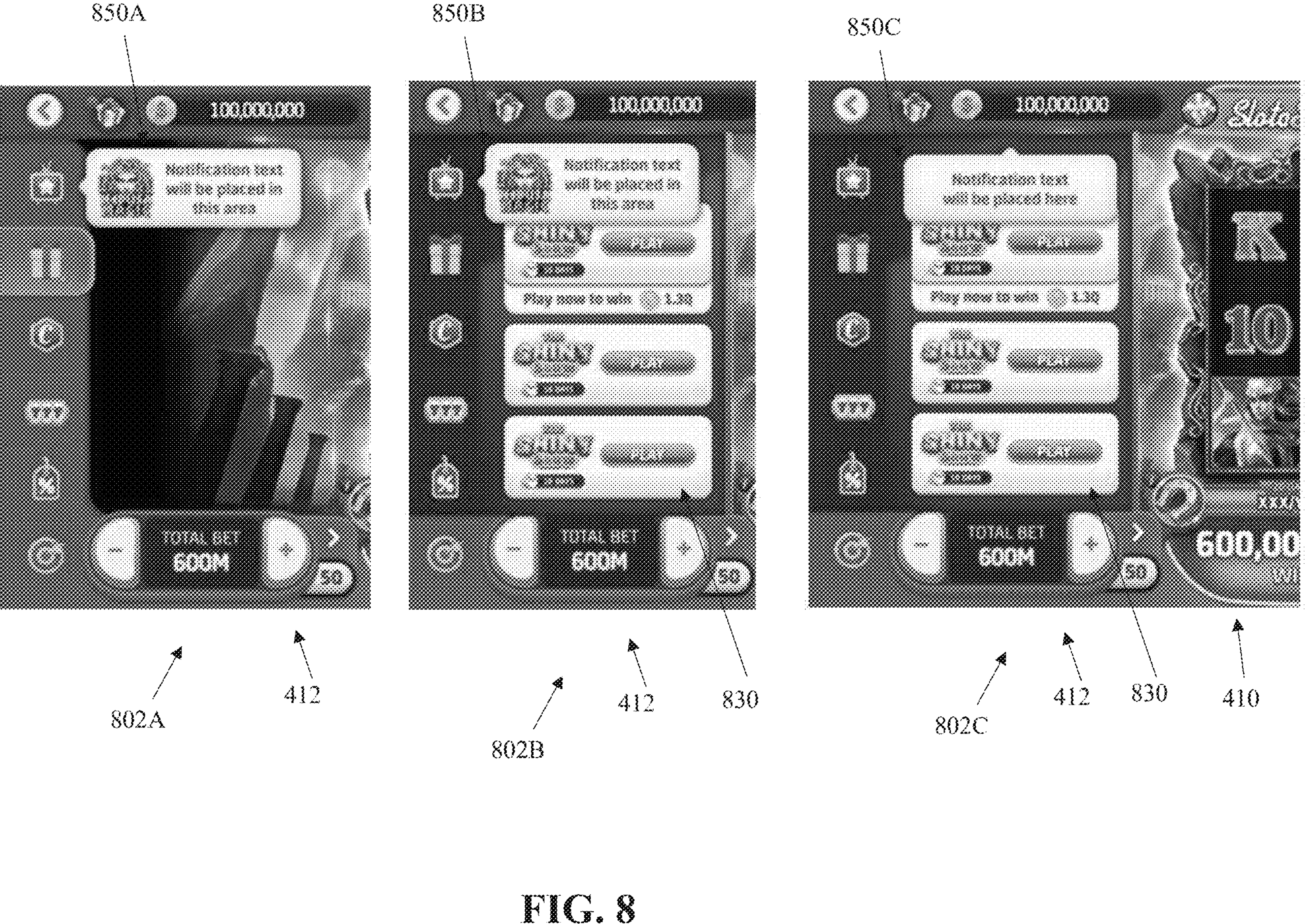
FIG. 8 includes schematics 802A-C of notifications 850A-C presented overlaid on GUI 402 of FIG. 4, in accordance with some embodiments of the present invention.
Figure 9:
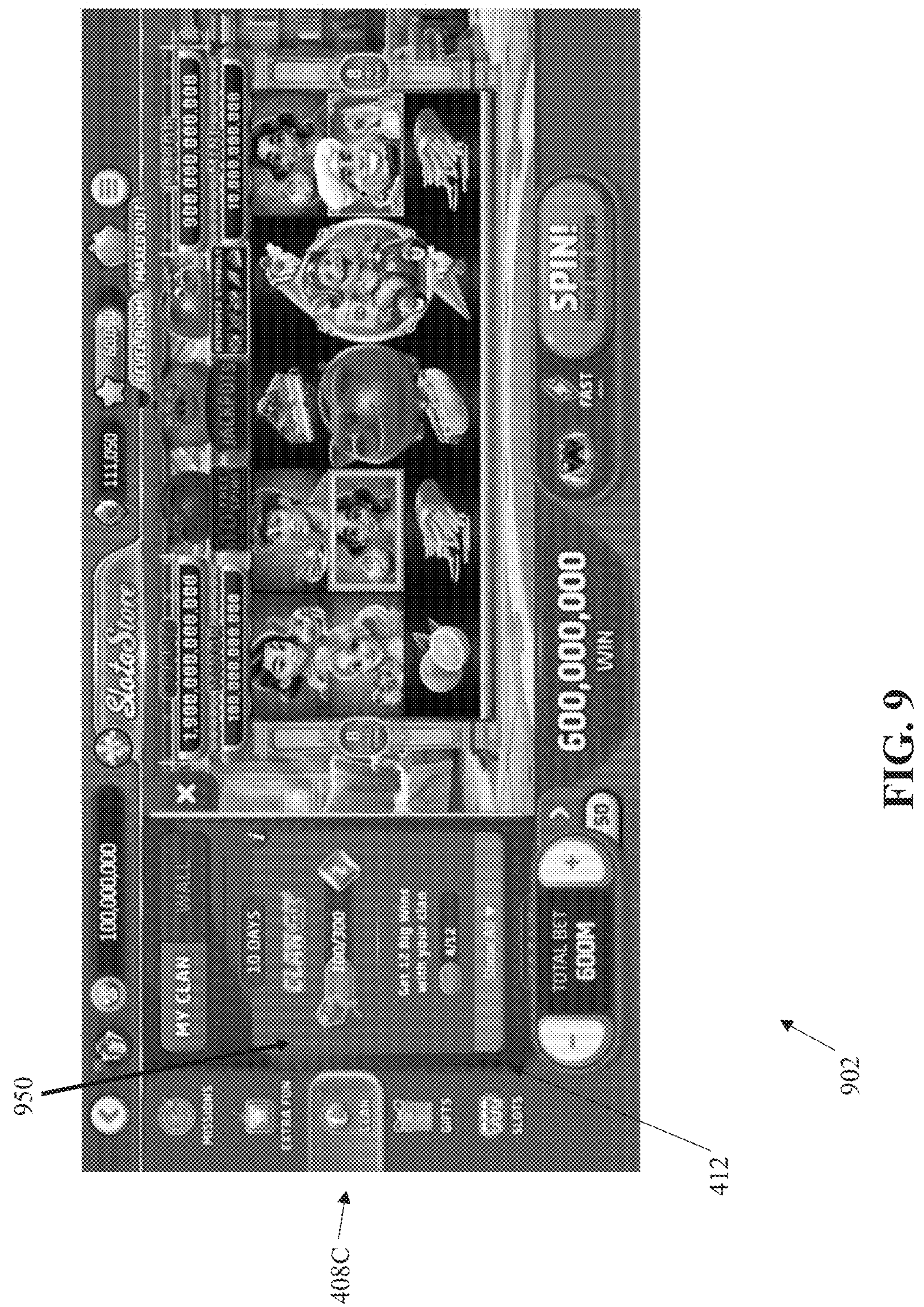
FIG. 9 is a schematic of GUI 402 described with reference to FIG. 4, presenting a GUI state 902 in response to selection of visual interactive element (clan) 408C, in accordance with some embodiments of the present invention.
Figure 10:
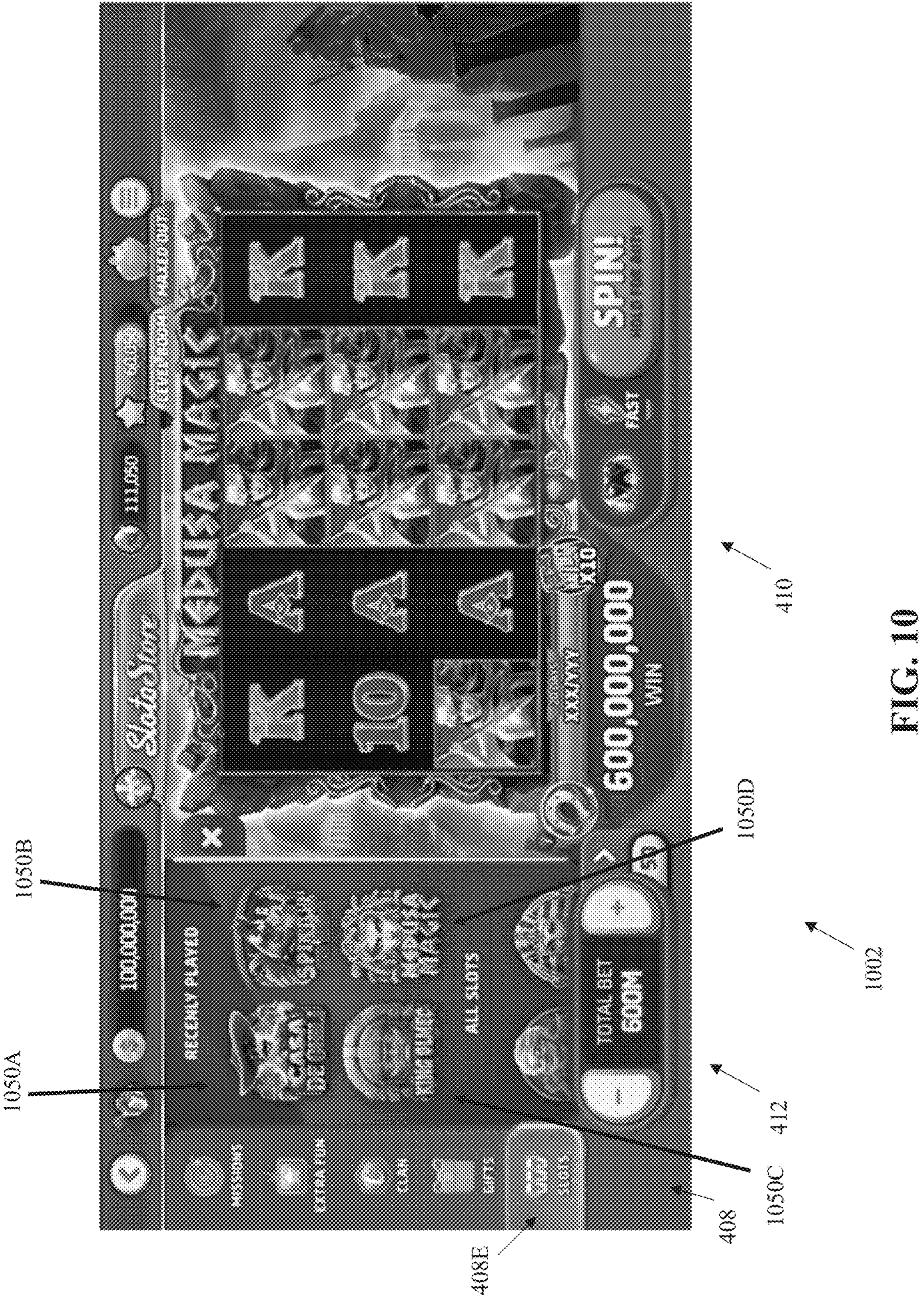
FIG. 10 is a schematic of another state 1002 of GUI 402 of FIG. 4 in response to selecting visual interactive element 408E (slots), in accordance with some embodiments of the present invention.

Reference is now made to FIG. 1, which is a block diagram of components of a system for operating a GUI for playing an online game, in accordance with some embodiments of the present invention. Reference is also made to FIG. 2, which is a flowchart of a method for operating a GUI for playing an online game, in accordance with some embodiments of the present invention. Reference is also made to FIG. 3, which is a schematic of an exemplary GUI 302 for an online game, in accordance with some embodiments of the present invention. Reference is also made to FIG. 4, which is a schematic of an exemplary GUI 402 for playing an online game, in accordance with some embodiments of the present invention. Reference is also made to FIG. 5A, which is a schematic of a state 502 of GUI 402 of FIG. 4 in response to selecting visual interactive element 408B (extra fun), in accordance with some embodiments of the present invention. Reference is also made to FIG. 5B, which is a schematic depicting examples of additional visual interactive elements 560 that may be presented in the third window of the GUI in response to selection of a certain visual interactive element from the second window, in accordance with some embodiments of the present invention. Reference is also made to FIG. 6, which is a schematic of another state 602 of GUI 402 of FIG. 4 in response to selecting visual interactive element 408B (extra fun), in accordance with some embodiments of the present invention. Reference is also made to FIG. 7, which is a schematic of another exemplary GUI 702 for playing an online game, in accordance with some embodiments of the present invention. Reference is also made to FIG. 8, which includes schematics 802A-C of notifications 850A-C presented overlaid on GUI 402 of FIG. 4, in accordance with some embodiments of the present invention. Reference is also made to FIG. 9, which is a schematic of GUI 402 described with reference to FIG. 4, presenting a GUI state 902 in response to selection of visual interactive element (clan) 408C, in accordance with some embodiments of the present invention. Reference is also made to FIG. 10, which is a schematic of another state 1002 of GUI 402 of FIG. 4 in response to selecting visual interactive element 408E (slots), in accordance with some embodiments of the present invention.

System 100 may implement the acts of the method described with reference to FIGS. 2-10 by processor(s) 102 of a computing environment 104 executing code instructions 106A stored in a memory 106 (also referred to as a program store).

Computing environment 104 may be implemented as, for example one or more and/or combination of: a computing cloud, a group of connected devices, a server, a virtual server, a client terminal, a virtual machine, a desktop computer, a thin client, a network node, and/or a mobile device (e.g., a Smartphone, a Tablet computer, a laptop computer, a wearable computer, glasses computer, and a watch computer).

Computing environment 104 may operate a GUI 114A for interacting with one or more online games 112B optionally simultaneously with one or more mini-games 112C, optionally managed by a game engine 112A, as described herein.

Game engine 112A may be hosted by a computing platform 112, for example, a server and/or computing cloud. Computing platform 112 may be implemented as, and/or may include, and/or be in communication with, a service engine that manages game engine(s) 112A. Game engine 112A may be designed for interaction by a single player or multiple players (e.g., simultaneously), optionally using respective client terminals 108 via a network 110.

Multiple architectures of system 100 based on computing environment 104 may be implemented. For example:

- Computing environment 104 may be separate from computing platform 112. In such architecture, computing environment 104 monitor interaction with GUI 114A by one or more client terminals 108 and/or instructs visual adaptation of GUI 114A presented on one or more client terminals 108 by communicating with game engine 112A, optionally via one or more application programming interfaces (API) 114B. It is noted that computing environment 104 may implement other features described herein.
- Computing environment 104 may be integrated with computing platform 112. In such architecture, game engine 112A may be directly hosted and/or operated and/or managed by computing environment 104.
- Computing environment 104 may host GUI 114A. GUI 114A may be executed by computing environment 104 and/or locally executed by client terminal 108. GUI 114A may be downloaded by client terminal 108 from computing environment 104 for local execution by computing environment 104. GUI 114A may be partially executed by computing environment 104 and partially executed by client terminal 108, for example, a client GUI code is installed on client terminal 108, which presents data received from computing environment 104 acting as a server and/or computing cloud.
- Computing environment 104 may be locally running on a dedicated device, for example, a mobile device and/or client terminal of a user. For example, a user uses their own computing environment 104 to operate GUI 114A for interacting with one or more games. Games may be locally hosted and executed by the dedicated device. Alternatively or additionally, GUI 114A running on the local device communicates with game engine 112A (optionally hosted by computing platform 112) over a network.

Computing environment 104 may provide the service of managing and/or updating GUI 114A to client terminals 108, for example by: providing software as a service (SaaS) to the client terminal(s) 108, providing software services accessible using a software interface (e.g., application programming interface (API), software development kit (SDK)), providing an application for local download to the client terminal(s) 108, providing an add-on to a web browser running on client terminal(s) 108, and/or providing functions using a remote access session to the client terminals 108, such as through a web browser executed by client terminal 108 accessing a web site hosted by environment device 104 such as remote access of computing environment 104.

Processor(s) 102 of computing environment 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2-10 when executed by processor(s) 102.

Computing environment 104 may include a data storage device 114 for storing data, for example, GUI 114A, APIs 114B, and/or other data to compute other features, as described herein. Data storage device 114 may be implemented as, for example, a memory, a local hard-drive, virtual storage, a removable storage unit, an optical disk, a storage device, and/or as a remote server and/or computing cloud (e.g., accessed using a network connection). It is noted that code stored on data storage device 114 may be loaded into memory 106 for execution by processor(s) 102.

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 116 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 (and/or other components such as client terminals 108) includes and/or is in communication with one or more physical user interfaces 150 that include a mechanism for a user to enter data into the GUI and/or view the GUI. Exemplary user interfaces 150 include, for example, one or more of, a touchscreen, a display, a virtual reality display (e.g., headset), gesture activation devices, a keyboard, a mouse, and voice activated software using speakers and microphone.

Referring now back to FIG. 2, at 202, a GUI is presented on a display of a client terminal.

Referring now back to FIG. 3, GUI 302 may include an optional background 304, and a first window 310, a second window 306, and a third window 312. It is to be understood that the locations and/or sizes of windows 310, 306, and 312 with respect to GUI 302 and/or with respect to background 304 are exemplary and not necessarily liming, as different orderings and/or positions may be selected.

First window 310 is associated with code that may communicate with an application programming interface (API) of a selected online game (e.g., selected by the user). The online selected game may be managed by a server. The code is designed for presenting and/or enabling a user to interact with, the selected online game within first window 310.

Second window 306 includes multiple visual interactive elements 308A-D (e.g., 4 are shown as a not necessarily limiting example, for example, buttons, icons, and the like, which may be designed for being selected by clicking or other implementations. Visual interactive elements 308A-D may be arranged a panel. Each visual interactive element 308A-D is associated with code for communicating with a different corresponding API associated with a different corresponding interactive application.

In at least one embodiment second window 306 is integrated with background 304 of GUI 302, for example, within a window defining GUI 302.

Third window 312 is associated with code that is triggered by input messages originating from windows 310 and/or 306, and/or may be generate output messages destined for processes executing with respect to windows 310 and/or 306.

The first window, the second window, and the third window are simultaneously presented in the GUI on the display of the client terminal while the selected online game is executing within the first window and while the interactive application corresponding to a selected visual interactive element is executing in the third window.

Referring now back to FIG. 4, GUI 402 includes a first window 410, a second window 406 and a third window 412. It is noted that the positions of first window 410 and third window 412 are interchanged in comparison to the positions of first window 310 and third window 312 of FIG. 3. GUI 402 is meant as a not necessarily limiting example, to help the reader understand the GUI using one specific example.

First window 410 depicts an online game, for example, a slot machine game. The online game may be for a single player, or for multiple players, i.e., simultaneous play by multiple different players each accessing the online game using their respective GUIs at their respective client terminals.

Second window 406 includes visual interactive elements 408A-E that trigger corresponding interactive applications in response to being selected, for example, missions 408A, extra fun 408B, clan 408C, gifts 408D, and slots 408E—as described in more detail below.

Third window 412 is triggered in response to a selection of one of visual interactive elements 408A-E, for example, presenting progress along different missions, triggered in response to selection of visual interactive element (missions) 408A.

Referring back to FIG. 7, GUI 702 includes a first window 710, a second window 706, and a third window 712. It is noted that the positions of first window 710 and third window 712 are interchanged in comparison to the positions of first window 410 and third window 412 of FIG. 4. Moreover, it is noted that the size of first window 710 is significantly larger than the size of first window 410 of FIG. 4. The size of second window 706 is the significantly smaller than the size of second window 406 of FIG. 4. For example, second window 706 is sized to be large enough to accommodate visual interactive elements 708A-F without leaving a significant amount of background and/or empty space. The size of third window 712 is the same or significantly smaller than the size of third window 412 of FIG. 4.

Referring now back to FIG. 2, at 204, a certain visual interactive element of the multiple visual interactive elements in the second window is selected via the GUI.

At 206, the selection of the certain visual interactive element triggers code that calls the corresponding API for triggering execution of the corresponding interactive application within the third window.

Optionally, the application running in the third window is implemented as a multi-user interactive session designed for communication between multiple GUIs executing on multiple different of client terminals of users and/or for presenting aggregated results from the different users playing their respective online games. The multi-user interaction session may be implemented, for example, as one or more of:

For multiple users playing a multi-player online game, where each user uses their own GUI to participate in a common session of the multi-player online game. The state of each user playing the online game using their respective GUI is presented in the first window. The aggregated results of the multiple users collectively playing the multi-player online game are presented in the third window. The server may receive messages regarding the state of the game from each first window in each GUI, aggregate the results, and send message to update the collective results in the third window of each GUI.

For multiple users each playing the same single-player online game. Each user uses their own GUI to play the online game by themselves. The state of each user playing their own session of the online game using their respective GUI is presented in the first window. Results of the different users may be aggregated and presented in the third window. For example, each user plays the slot machine by themselves. The win/losses of all the players together are computed and presented on in the third window of each GUI. The server may receive messages regarding the state of the game from each first window in each GUI, aggregate the results, and send message to update the collective results in the third window of each GUI.

The application running in the third window may include a multi-user chat session, enabling different users to communicate between themselves. The multi-user chat session relays data posted by the different users via their own third windows on their GUIs, to the other third windows of the other GUIs so each user is able to post data and view the posted data. The users may be interacting via the multi-user chat session while each user is playing a single-player, or participating in a multi-player game with the other users. Client terminals used by the users are simultaneously interacting with the selected online game.

Referring now back to FIG. 9, schematic of GUI 402 described with reference to FIG. 4, presenting a GUI state 902 in response to selection of visual interactive element (clan) 408C. Third window 412 presents a multi-user interactive session 950, for example, presenting aggregated results of multiple different users playing the same online game.

Referring now back to FIG. 2, at 206, in response to selecting a visual interactive element from the second window (e.g., mapped to features), multiple additional visual interactive elements are presented in the third window. Each of the additional visual interactive elements is associated with code for triggering a different feature of the selected online game executing in the first window. In response to selecting another visual interactive element from the additional visual interactive elements, the specific feature corresponding to the additional visual interactive element is implemented, optionally within the selected online game presented in the first window. In another example, the specific feature corresponding to the additional visual interactive element is implemented within the third window, for example, as a mini-game described herein, and/or by presenting certain data, optionally computed based on data obtained from the online game being played in the first window.

Referring now back to FIG. 5A, the state 502 of GUI 402 of FIG. 4 in response to selecting visual interactive element 408B (extra fun) is shown. Additional visual interactive elements 550A-D are presented in third window 412. The visual interactive elements 550A-D may correspond to mini games, which may be triggered by selecting (e.g., pressing) for example a “play” button, data regarding the online game being played in first window 410, which may be triggered for example, by a “view” button, and/or special features for implementing in the online game being played in first window 410, which may be triggered for example, by a “turn on” button. Alternatively, a generic “open” button may be used to trigger any additional visual interactive element. It is noted that the labels such as “play” and “view” are exemplary and not necessarily limiting.

Referring now back to FIG. 5B, examples of additional visual interactive elements 560 that may be presented in the third window of the GUI in response to selection of a certain visual interactive element from the second window, are shown. The additional visual interactive elements may represent the set of all available visual interactive elements. A sub-set may be selected for presentation in the third window, in response to selection of the corresponding visual interactive element from the second window. The order of the additional visual interactive elements (e.g., sub-set) for presentation in the third window may be selected.

Referring now back to FIG. 2, at 206, in response to selecting a visual interactive element from the second window mapped to a mini-game, optionally a mini-online game, optionally managed by the server, the mini-game is executed within the third window. Alternatively, in response to selecting a visual interactive element from the second window mapped to an interactive application (e.g., features), multiple additional visual interactive elements are presented in the third window. Each of the additional second visual interactive elements is associated with code for triggering a different mini-game for execution in the third window. The code may terminate the presentation of the second visual interactive elements in the third window, and/or the second visual interactive elements may be executed in the background and/or paused. Alternatively, the mini-game is executed as an overlay over the second visual interactive elements presented in the third window. The second visual interactive elements may be re-presented or uncovered in response to termination of the mini-game. The mini-game may be executed in response to a selection of the corresponding second visual interactive element in the third window.

The mini-game is designed and/or executed for being presented with and/or being interacted with in the third window simultaneously with execution of the selected online game that is being presented and/or interacted with in the first window. The mini-game may be:

- Designed for being presented and/or interacted to be played within a small play area defined by the third window. The third window may be significantly smaller than a full screen and/or smaller than the first window.
- Designed for being presented with and/or interacted with on a full screen, and is dynamically minimized for execution for being presented with and/or interacted in the third window. For example, the mini-game may be a standard online game designed to be played in the first window that is dynamically adapted to be played in the third window, for example, the presentation of the mini-game is reduced in size to comply with the third window, extra background and/or surrounding objects are removed to focus on a smaller area of interest presented within the third window and the like.

Referring now back to FIG. 6, state 602 of GUI 402 of FIG. 4 in response to selecting visual interactive element 408B (extra fun) is depicted. Alternatively, state 602 of the GUI may be in response to selecting one of the mini-games using one of the additional interactive visual interactive elements 550A0D presented in second window 412, as shown in FIG. 5A. For example, the “blast” game 550B is selected. The selected mini-game 650 is executing in second window 412.

Referring now back to FIG. 2, at 206, the selected online game may be mapped (e.g., virtually mapped) to a virtual device which may be located at a virtual location. For example, the online game may be a game of slots, the virtual device is a virtual slot machine, and the virtual location may be, for example, in a certain virtual city, a certain virtual game room, and/or at a certain virtual location within the virtual game room. The different corresponding interactive applications associated with the visual interactive elements presented in the second window may include different candidate virtual devices located at different virtual locations. Alternatively, the different corresponding interactive applications may be associated with the additional visual interactive elements presented in the third window in response to a selection of a certain visual interactive element presented in the second window, for example, an icon of “slots” or “change machines”, or “change game”, and the like.

Each candidate virtual device may be linked to a different online game. For example, the different corresponding interactive applications are different slot games, the candidate virtual device are different virtual slot machines that run the corresponding slot games, and the candidate virtual devices may be located, for example, in different virtual cities, different virtual game rooms of a common virtual building, and/or different virtual games in different locations within a common virtual game room.

One visual interactive element in the second window or selection of one additional visual interactive element in the third window is selected. The selected visual interactive element or additional visual interactive element, is mapped to a different virtual device at a different virtual location associated with a different online game (i.e., different than the online game running in the first window). Code may call the corresponding API of the online game corresponding to the selected visual interactive element or the additional visual interactive element. The API call may triggering the different online game for execution and/or interaction within the first window.

The preceding feature allows a user to quickly change their online game running in the first window via a selection, optionally a single click selection, made via the third window or second window. This is in contrast to, for example, the user needing to exit the online game running in the first window, exit the current virtual location of the virtual device running the online game, and virtually move to another virtual location of another virtual device to select another online game. For example, to exit a first virtual game room to the lobby, then move from the lobby to a second virtual game room where another virtual machine running another virtual game is located. In another example, to virtually travel from virtual Las Vegas to virtual Atlantic City. It is noted that the aforementioned feature of switching from one online game to another online game via the third window or second window may be implemented for online games which are not necessarily mapped to virtual devices and/or virtual locations.

Referring now back to FIG. 10, state 1002 of GUI 402 of FIG. 4 in response to selecting visual interactive element 408E (slots) from second window 408 is presented. Visual interactive element 408E triggers presentation of additional visual interactive elements 1050A-D (e.g., there may be a different number of visual interactive elements) in third window 412. Each visual interactive element 1050A-D is virtually mapped to and/or designed to trigger, a corresponding online game for playing in first window 410. The online game currently being played in first window 410 is dynamically replaced by the new online game corresponding to the visual interactive element selected from 1050A-D in the third window. The current online game and the other online games corresponding to visual interactive element 1050A-D may be mapped to different virtual machines which may be located at different virtual location, as described herein. Selection of the visual interactive element selected from 1050A-D in the third window enables dynamically switching virtual machines and/or virtual locations, for dynamically switching the online game played in first window 410 to the virtual machine and/or virtual location corresponding to the selected visual interactive element, without requiring additional interactions to perform the change in virtual machine and/or virtual location using additional intermediate steps.

Referring now back to FIG. 2, at 208, the first window, optionally the state of the online game being played in the first window, may be dynamically updated based on a monitoring of the third window.

One or more metrics of the interactive application executing in the third window may be dynamically monitored. For example, the monitoring may be of the mini-game during interaction by the user via the third windows. The metric(s) being monitored may include, for example, amount of virtual currency and/or points earned by the user playing the mini-game, progression of the user within the mini-game, milestones reached by the user, and virtual objects and/or character attributes earned by the user playing the mini-game.

An updated state of the online game is computed according to the metric. For example, the monitoring of the metric is performed locally by code running in the third window of the GUI, and/or centrally by the game engine. The metric may be sent to the user, which computes the update to the state of the online game. The server may dynamically instruct the updating of the visual presentation of the online game executing in the first window according to the update state. For example, when the user earned enough points playing the mini-game in the third window, the user may gain another spin on the slot machine being played in the first window. In another example, when the user finds a special portion while playing the mini-game in the third window, the portion may be used by a character of the online game played in the first window.

Optionally, a selection of a sub-element presented in the third window is made via the GUI. The selection may be made via the API of the interactive application executing in the third window. An updated game state of the online game executing in the first window is computed according to the selected sub-element. A message indicating the selection of the sub-element may be sent to a server via the API of the interactive application running in the third window. The server may compute the updated state of the online game running in the first window. The server may dynamically instruct the GUI to update the first window for dynamically updating the virtual presentation within the first window according to the updated game state.

In an example, the interactive application executing in the third window is a virtual store. The selection of the sub-element presented in the third window may be implemented as a purchase of a virtual object or virtual attribute. Virtual objects and/or virtual attributes purchased and/or obtained in the virtual store may be implemented in the online game executing in the first window. An amount of virtual currency available for being used for purchase in the virtual store may be presented in the first window. The amount of virtual currency may be computed based on metric(s) measured by the monitoring of the state of the online game in the first window. For example, the server may compute the amount of coins that a player earns based on monitoring of spinning of the slot machine game in the first window. The server may send a message to the API of the online store running in the third window, indicating the amount of coins. The server may receive a message from the API of the online store indicating that the player bought a "power spin". The server may send a message to the API of the online game to update the first window to present the "power spin" and/or implement the "power spin" by spinning the slot machine wheel more powerfully.

At 210, the third window may be updated based on a monitoring of the first window.

Data and/or metric(s) based on a current game state of the selected online game executing in the first window may be computed in response to interaction by a user with the selected online game. The data and/or metric(s) may be computed by a server receiving messages via the API of the online game and/or monitoring via the API of the online game. The computed data and/or metric(s) may be forwarded to the API of the interactive application executing in the third window. The server may perform intermediate analysis of the computed data and/or metrics, and send the results of the analysis to the interactive application executing in the third window. A visual presentation within the third window may be dynamically updated according to a state of the interactive application executing in the third window in response to the computed data and/or metric(s).

In an example, the interactive application executing in the third window may include a visual presentation of a state of multiple missions for the user to complete by playing the selected online game executing in the first window. The state of the missions is dynamically updated according to the data and/or metric(s) computed based on the current game state of the selected online game. For example, the missions may be to get two wins in a row two times, open 5 megapods as a clan, obtain a total amount of virtual currency, and the like.

At 212, an order of the visual interactive elements presented in the second window may be dynamically adapted. A mapping between each of the visual interactive elements and corresponding interactive application is maintained during the re-ordering. The reordering may be performed in response to an interaction action performed on one or more of the visual interactive elements by a user interacting with the second window, for example, the user may drag and drop the visual interactive elements into a desired order.

At 216, the GUI may be dynamically updated for presenting a notification in a fourth window. The fourth window may be presented without being overlaid on the first window. This enables the user to simultaneously continue uninterrupted play of the game in the first window and/or without the notification blocking the first window. The notification may be presented overlaid on the third window, overlaid on the second window, overlaid on a combination of the second and third windows, and/or presented in another location without overlaying over the second and third windows.

The notification may be generated, for example, based on:

- A monitored state of the online game executing in the first window, for example, "Only 10 more coins to win the super prize!".
- Based on a monitored state of the interactive application executing in the third window, for example, "Player bought a super slot roll!"
- Based on a monitored state of another user using another GUI to play the same online game and/or another online game, and the like, for example, "Your friend is ahead of you by only 2 coins!".

The presentation of the notification may be terminated when the monitored state of the online game and/or interactive changes to a second state unrelated to the notification. For example, when the notification is no longer relevant.

Referring now back to FIG. 8, notifications 850A-C presented in schematics 802A-C do not overlay first window 410. Schematic 802A shows notification 850A overlaying on third window 412 when no interactive application has been selected, for example, a background is shown in third window 412. Schematic 802B shows notification 850B overlaid on additional visual interactive elements 830 presented within third window 412. Schematic 820C shows notification 850B overlaid on additional visual interactive elements 830 presented within third window 412 and not overlaid on first window 410.

At 218, one or more features described with reference to 204-216 may be iterated, for dynamically updating the GUI.

Optionally, the interactive application executing in the third window is dynamically switched to a second interactive application. The dynamic switching is triggered in response to another selection of another visual interactive element presenting in the second window. The dynamic switching is performed while the selected online game is executing within the first window.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant GUIs will be developed and the scope of the term GUI is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for operating a graphical user interface (GUI), comprising:

a network interface configured for communicating with at least one client terminal over a network;

a data storage device storing code;

at least one processor of a server in operative communication with the network interface and with the data storage device, executing the code for:

presenting a GUI on a display of a client terminal, wherein the GUI includes:

a first window associated with code that communicates with an application programming interface (API) of a selected online game managed by the server for presenting and/or interacting with the selected online game within the first window, a second window comprising a panel of a plurality of visual interactive elements, wherein each visual interactive element of the plurality of visual interactive elements communicates with a different corresponding API associated with a different corresponding interactive application, such that each visual interactive element in the panel is individually mapped to a distinct interactive application that is different from the selected online game executing in the first window, and a third window, wherein, in response to a selection of a visual interactive element in the second window, calling the corresponding API mapped to the selected visual interactive element for triggering execution of the corresponding interactive application within the third window, wherein the first window, the second window, and the third window are simultaneously presented in the GUI while the selected online game is executing within the first window and while the interactive application corresponding to the selected visual interactive element is executing in the third window, wherein in real-time, bidirectional cross-window communication is conducted via the respective APIs such that actions performed in the third window directly update a game state of the selected online game in the first window via the API of the selected online game, while game progress in the first window simultaneously updates mission status and other metrics in the third window via the API of the interactive application executing in the third window; and wherein the interactive application running in the third window comprises a multi-user interactive session configured for communication between a plurality of GUIs executing on a plurality of client terminals of a plurality of users, wherein each of the plurality of GUIs simultaneously presents a respective online game executing in the first window of that GUI, and wherein the multi-user interactive session in the third window of each of the plurality of GUIs is configured for communication between the plurality of client terminals while each respective online game is executing in the first window of the respective GUI.

2. The system of claim 1, wherein the selected online game is mapped to a first virtual device located at a first virtual location, wherein the different corresponding interactive applications associated with the plurality of visual interactive elements presented in the second window comprise a plurality of candidate virtual devices located at a plurality of corresponding virtual locations, each candidate virtual device linked to a different online game, and further comprising code for:

in response to the selection of the visual interactive element in the second window mapped to a second virtual device at a second virtual location associated with a second online game, calling the corresponding API for triggering execution of the second online game for execution and/or interaction within the first window.

3. The system of claim 2, wherein the corresponding interactive applications comprise slot games, the plurality of candidate virtual devices comprise a plurality of virtual slot machines that run the slot games.

4. The system of claim 1, wherein the selected online game is configured for a single-player, wherein a plurality of client terminals used by a plurality of users are simultaneously interacting with the selected online game each as the single-player, and wherein the application running in the third window comprises a multi-user interactive session configured for communication between GUIs executing on a plurality of client terminals of a sub-set of the plurality of users interacting with the selected online game.

5. The system of claim 1, further comprising code for:

computing data based on a current game state of the selected online game executing in the first window in response to interaction by a user with the selected online game;

forwarding the computed data to the API of the application executing in the third window; and dynamically updating a visual presentation within the third window according to a state of the application executing in the third window in response to the computed data.

6. The system of claim 5, wherein the application executing in the third window comprises the visual presentation of a state of a plurality of missions for the user to complete by playing the selected online game executing in the first window, wherein the state of the plurality of missions is dynamically updated according to the data computed based on the current game state of the selected online game.

7. The system of claim 1, further comprising code for:

receiving a selection of a sub-element presented in the third window via the API of the application executing in the third window;

computing an updated game state of the selected online game executing in the first window according to the selected sub-element; and dynamically updating a virtual presentation within the first window according to the updated game state.

8. The system of claim 7, wherein the application executing in the third window comprises a virtual store for purchasing virtual objects and/or virtual attributes for implementation in the online game executing in the first window, wherein an amount of virtual currency available for being used for purchase in the virtual store is presented in the first window and computed based on at least one metric measured from monitoring of a state of the online game in the first window, and wherein the selection of the sub-element presented in the third window comprises a purchase of a virtual object or virtual attribute.

9. The system of claim 1, further comprising code for:

in response to selecting a visual interactive element from the second window mapped to features, presenting a plurality of second visual interactive elements in the third window, each of the plurality of second visual interactive elements is associated with code for triggering a different feature of the selected online game executing in the first window;

in response to selecting a second visual interactive element from the plurality of second visual interactive elements, implementing the specific feature corresponding to the second visual interactive element within the selected online game presented in the first window.

10. The system of claim 1, further comprising code for:

in response to selecting a visual interactive element from the second window mapped to a mini-game managed by the server, executing the mini-game within the third window, wherein the mini-game is executed for being presented with and/or being interacted with in the third window simultaneously with execution of the selected online game that is being presented and/or interacted with in the first window.

11. The system of claim 10, further comprising code for:

dynamically monitoring at least one metric of the mini-game during interaction by the user via the third window; and computing an updated state of the online game according to the at least one metric; and dynamically updating a visual presentation of the online game executing in the first window according to the updated state.

12. The system of claim 10, further comprising code for:

in response to selecting a visual interactive element from the second window mapped to features, presenting a plurality of second visual interactive elements in the third window, each of the plurality of second visual interactive elements is associated with code for triggering a different mini-game for execution in the third window and terminating the presentation of the plurality of second visual interactive elements in the third window, wherein the mini-game is executed in response to a selection of a corresponding second visual interactive element in the second window.

13. The system of claim 10, further comprising code for:

in response to an interaction action performed on at least one of the plurality of visual interactive elements by a user interacting with the second window, dynamically adapting an order of the plurality of visual interactive elements while maintaining a mapping between each of the plurality of visual interactive elements and corresponding interactive application, wherein the mini-game is executed in response to a selection of one of the plurality of visual interactive elements.

14. The system of claim 1, further comprising code for:

in response to a second selection of a second visual interactive element in the second window, dynamically switching the interactive application executing in the third window to a second interactive application triggered in response to the second selection, wherein the dynamically switching is performed while the selected online game is executing within the first window.

15. The system of claim 1, further comprising code for:

monitoring a state of the online game executing in the first window;

generating a notification according to the state;

dynamically presenting the notification in a fourth window overlaid on the third window and excluding overlay on the first window; and terminating the presentation when the monitored state of the online game changes to a second state unrelated to the notification.

16. The system of claim 10, wherein the mini-game is at least one of:

(i) designed for being presented with and/or interacted with in the third window which is significantly smaller than a full screen and/or smaller than the first window;

(ii) designed for being presented with and/or interacted with on a full screen, and is dynamically minimized for execution for being presented with and/or interacted in the third window.

17. A method of operating a graphical user interface (GUI), comprising:

presenting a GUI on a display of a client terminal, wherein the GUI includes:

a first window associated with code that communicates with an application programming interface (API) of a selected online game managed by a server for presenting and/or interacting with the selected online game within the first window, a second window comprising a panel of a plurality of visual interactive elements, wherein each visual interactive element of the plurality of visual interactive elements communicates with a different corresponding API associated with a different corresponding interactive application, such that each visual interactive element in the panel is individually mapped to a distinct interactive application that is different from the selected online game executing in the first window, and a third window, wherein, in response to a selection of a visual interactive element in the second window, calling the corresponding API mapped to the selected visual interactive element for triggering execution of the corresponding interactive application within the third window, wherein the first window, the second window, and the third window are simultaneously presented in the GUI while the selected online game is executing within the first window and while the interactive application corresponding to the selected visual interactive element is executing in the third window, wherein in real-time, bidirectional cross-window communication is conducted via the respective APIs such that actions performed in the third window directly update a game state of the selected online game in the first window via the API of the selected online game, while game progress in the first window simultaneously updates mission status and other metrics in the third window via the API of the interactive application executing in the third window; and wherein the interactive application running in the third window comprises a multi-user interactive session configured for communication between a plurality of GUIs executing on a plurality of client terminals of a plurality of users, wherein each of the plurality of GUIs simultaneously presents a respective online game executing in the first window of that GUI, and wherein the multi-user interactive session in the third window of each of the plurality of GUIs is configured for communication between the plurality of client terminals while each respective online game is executing in the first window of the respective GUI.

18. A non-transitory medium storing program instructions for operating a graphical user interface (GUI), comprising program instructions which when executed by at least one processor, cause the at least one processor to:

present a GUI on a display of a client terminal, wherein the GUI includes:

a first window associated with code that communicates with an application programming interface (API) of a selected online game managed by a server for presenting and/or interacting with the selected online game within the first window, a second window comprising a panel of a plurality of visual interactive elements, wherein each visual interactive element of the plurality of visual interactive elements communicates with a different corresponding API associated with a different corresponding interactive application, such that each visual interactive element in the panel is individually mapped to a distinct interactive application that is different from the selected online game executing in the first window, and a third window, wherein in response to a selection of a visual interactive element in the second window, call the corresponding API mapped to the selected visual interactive element for triggering execution of the corresponding interactive application within the third window, wherein the first window, the second window, and the third window are simultaneously presented in the GUI while the selected online game is executing within the first window and while the interactive application corresponding to the selected visual interactive element is executing in the third window, wherein in real-time, bidirectional cross-window communication is conducted via the respective APIs such that actions performed in the third window directly update a game state of the selected online game in the first window via the API of the selected online game, while game progress in the first window simultaneously updates mission status and other metrics in the third window via the API of the interactive application executing in the third window; and wherein the interactive application running in the third window comprises a multi-user interactive session configured for communication between a plurality of GUIs executing on a plurality of client terminals of a plurality of users, wherein each of the plurality of GUIs simultaneously presents a respective online game executing in the first window of that GUI, and wherein the multi-user interactive session in the third window of each of the plurality of GUIs is configured for communication between the plurality of client terminals while each respective online game is executing in the first window of the respective GUI.

* * * * *